United States Patent [19]

Yehuda

[11] Patent Number: 5,245,163
[45] Date of Patent: Sep. 14, 1993

[54] QUEUE MONITORING AND/OR CONTROL SYSTEM

[75] Inventor: Abraham Bar-Yehuda, Rishon Lezion, Israel

[73] Assignee: The Taylor Institute for Industrial Management Science Ltd., Tel-Aviv, Israel

[21] Appl. No.: 887,948

[22] Filed: May 26, 1992

[30] Foreign Application Priority Data

May 28, 1991 [IL] Israel ......................................... 98294

[51] Int. Cl.⁵ ............................................. G06K 7/10
[52] U.S. Cl. .................................. 235/377; 235/379; 235/380; 235/383
[58] Field of Search ............... 235/379, 380, 383, 377; 364/408

[56] References Cited

U.S. PATENT DOCUMENTS 4,621,326 11/1986 Rawlins ................................ 364/408
4,700,295 10/1987 Katsof et al. ......................... 235/379
4,833,312 5/1989 Minematsu ........................... 235/379

Primary Examiner—Harold Pitts
Attorney, Agent, or Firm—Benjamin J. Barish

[57] ABSTRACT

A queue monitoring and/or control system for monitoring and/or controlling a queue of persons waiting for service by a plurality of clerks. A card dispenser dispenses sequentially-numbered cards to persons as each joins the end of the queue; a card reader for each clerk for reading the card number when received by the clerk from each person as each reaches a clerk at the beginning of the queue. A real time clock for indicates the queue joining time for each card dispensed by the dispenser to a person when joining the end of the queue, and the clerk reaching time for each card read by the card readers as each person reaches a clerk at the beginning of the queue. A data processor processes the above data according to permissible queue parameters.

13 Claims, 2 Drawing Sheets

QUEUE MONITORING AND/OR CONTROL SYSTEM

FIELD AND BACKGROUND OF THE INVENTION

The present invention relates to a queue monitoring and/or control system, and particularly to a system for monitoring and/or controlling a queue of persons waiting for service by a plurality of clerks.

One particular application of the present invention is in commercial banks servicing a large number of customers. According to the present practise, the customers form a single queue which is serviced by a plurality of tellers, and as each customer reaches the beginning of the queue the customer proceeds to the first available teller. In such a system, the queue length will increase with an increase in the rate of customers joining the queue or with a decrease in the number of tellers servicing the queue, and will decrease with a decrease in the number of customers joining the queue or with an increase in the number of tellers servicing the queue. If the queue becomes too long, this increases the waiting time of the customers and breeds dissatisfaction; but if the queue disappears altogether, this results in one or more tellers being idle and thereby a wastage of labor.

At the present time such queues are generally monitored and controlled by visual observation and personal judgement. However, such a system is very inefficient since it is not only imprecise, resulting in lines becoming too long or completely eliminated, but is also time-consuming since it requires continuous observation by management personnel.

While queue monitoring and control systems are particularly useful in commercial bank applications, it will be appreciated that the same problems exist with respect to other applications, such as official institutions servicing the public, wherever a queue of persons is formed waiting for service by a plurality of clerks.

OBJECTS AND BRIEF SUMMARY OF THE INVENTION

An object of the present invention is to provide a queue monitoring and/or control system particularly useful in commercial banks, but also useful in other applications, having advantages in the respects discussed above.

According to the present invention, there is provided a queue monitoring and/or control system for monitoring and/or controlling a queue of persons waiting for service by a plurality of clerks, comprising: a card dispenser for dispensing sequentially-numbered cards to persons as each joins the end of the queue; a plurality of card readers, one for each clerk, for reading the card number when received by the clerk from each person as each reaches a clerk at the beginning of the queue; a real time clock for indicating the queue joining time for each card dispensed by the dispenser to a person when joining the end of the queue, and the clerk reaching time for each card read by the card readers as each person reaches a clerk at the beginning of the queue; and a data processor including: means for inputting predetermined fixed data relating to permissible queue parameters; means for inputting the card numbers and queue joining times from the card dispenser and the real time clock, and the card numbers and clerk reaching times from the card readers and the real time clock; and programmed means for controlling the data processor to indicate any changes in the number of clerks required in order to comply with the permissible queue parameters of the inputted fixed data.

According to further features in the preferred embodiment of the invention described below, the means for inputting the predetermined fixed data inputs data specifying maximum and minimum waiting times, maximum queue length, and/or average service time; and the programmed means controls the data processor to indicate any changes in the number of clerks required in order to comply with such specified data.

According to further features in the preferred embodiment of the invention described below, the data processor further includes display means for displaying the number of clerks if any to be added or subtracted, the current queue length, the current queue waiting time, and/or the average service time.

According to still further features in the described preferred embodiment, the data processor further includes an accumulator and printer for accumulating the data displayed in the display means and for printing out the data at the end of a predetermined time interval.

According to a still further feature in the described preferred embodiment, the card dispenser dispenses cards having their numbers coded in the form of a bar code, and the card readers include means for reading the bar code.

As will be more apparent from the description below, such a system provides an efficient means for monitoring and controlling a queue so as to minimize the average waiting time while at the same time minimizing the number of tellers needed for servicing the queue.

The system may also be used for analyzing the queuing that takes place at a particular location in order to provide a report of the relevant statistics and the manpower needs for that location. For example, the system may be first used on a temporary basis for obtaining the statistical data required for a particular location, and/or on a permanent basis for actually monitoring and controlling queues as described above.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
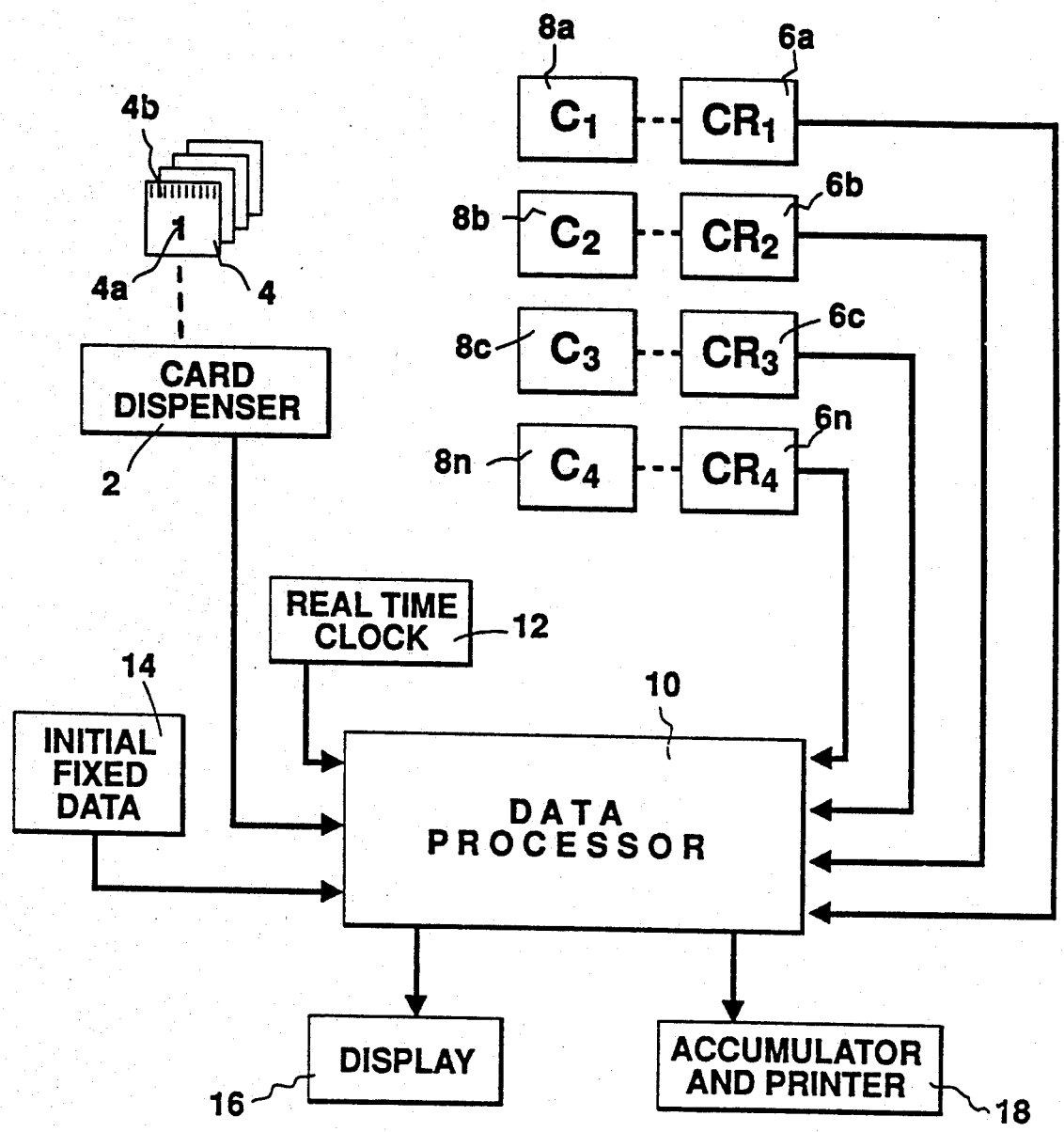
FIG. 1 is a block diagram illustrating one form of queue monitoring and control system constructed in accordance with the present invention.

The queue monitoring and control system illustrated in the drawings is intended for use particularly in a commercial bank or other institution servicing the public, where a plurality of customers form a queue as they wait for service by one of a plurality of clerks or tellers. As each customer arrives, the customer joins the end of the queue; and as each teller finishes a transaction of a preceding customer and becomes available, the teller receives the customer at the beginning of the queue.

The queue monitoring and control system illustrated in FIG. 1 comprises a card dispenser, generally designated 2, which dispenses a card 4 to each customer as each arrives at the end of the queue. Each card 4 is sequentially numbered, as indicated at 4a, and the card number is coded by a bar code 4b. The dispenser can dispense pre-numbered cards and read each number as dispensed, or can include a printer which prints each card and its coded number automatically each time a card is removed.

The illustrated system further includes a plurality of card readers, as shown at 6a-6n, each allocated for, and located adjacent, one of the bank clerks or tellers 8a-8n. Each card reader is capable of reading the bar code 4b of the card 4 when received by the clerk as each customer reaches the clerk at the beginning of the queue.

The illustrated system further includes a central data processor, generally designated 10, which receives the information from the card dispenser 2 and also from the plurality of card readers 6a-6n. Data processor 10 includes a real time clock 12 which indicates the queue joining time for each customer as each receives a card from dispenser 2. Clock 12 also indicates the clerk reaching time as each card is read by the card reader 6a-6n when the person reaches a clerk at the beginning of the queue. This information, together with the card number and clerk identification, is fed to the data processor 10.

Data processor 10 further includes means for inputting predetermined fixed data relating to permissible queue parameters. The fixed data inputting means, shown schematically at 14 in FIG. 1, may be a keyboard or the like. For example, input means 14 illustrated in FIG. 1 inputs the following fixed data:

1. maximum waiting time;
2. permitted deviation in maximum waiting time;
3. minimum waiting time;
4. permitted deviation in minimum waiting time;
5. maximum number of clerks;
6. minimum number of clerks;
7. maximum queue length; and
8. desired average service time.

The queue monitoring and control system illustrated in FIG. 1 further includes a display unit, generally designated 16, which displays various data during the operation of the system. For example, the displayed data may include the following:

1. number of on-line clerks;
2. number if any of clerks to be added;
3. number if any of clerks to be subtracted;
4. current waiting time;
5. current line length;
6. average servicing time.

The illustrated system further includes, preferably within the data processor 10, an accumulator and printer of statistical data, as schematically shown at 18. Thus, the various transactions performed during the day are accumulated for statistical purposes, and can be printed out at the end of the day or whenever else desired. Such statistical data may include, for example: the number of customers serviced during the day; the number of clerks or clerk hours utilized for servicing the customers; the average, maximum, and/or minimum waiting time; the maximum, minimum, and/or average line length; the maximum, minimum, and/or average service time; etc. It will be appreciated that all this information can be computed by the data processor 10 from the changeable data inputting thereto by the card dispenser 2, card readers 6a-6n, and the real time clock 12, as well as from the fixed data initially inputted via the input 14.

The data processor 10 may also be used for processing, displaying, accumulating, and printing out other types of data. For example, the card readers 6a-6n allocated to the clerks can also be used for inputting into the data processor 10 an indication of the type of transaction involved, e.g., deposit, withdrawal, payment of bill, ordering a new telephone, renewing a passport, etc., enabling the data processor to process, display, accumulate and print out this type of data.

In some applications, a special card reader, held by an operator, may be used to record this type of data, which data is to be transferred periodically to data processor 10.

Each clerk station 8a-8n could also include a customer detector, such as a photo-detector or proximity detector, for detecting the time the customer is in the clerk station obtaining service. This would enable the system to detect the arrival and departure of a customer should the customer neglect to take a card from the dispenser or hand it over to the clerk.

Figure 2:
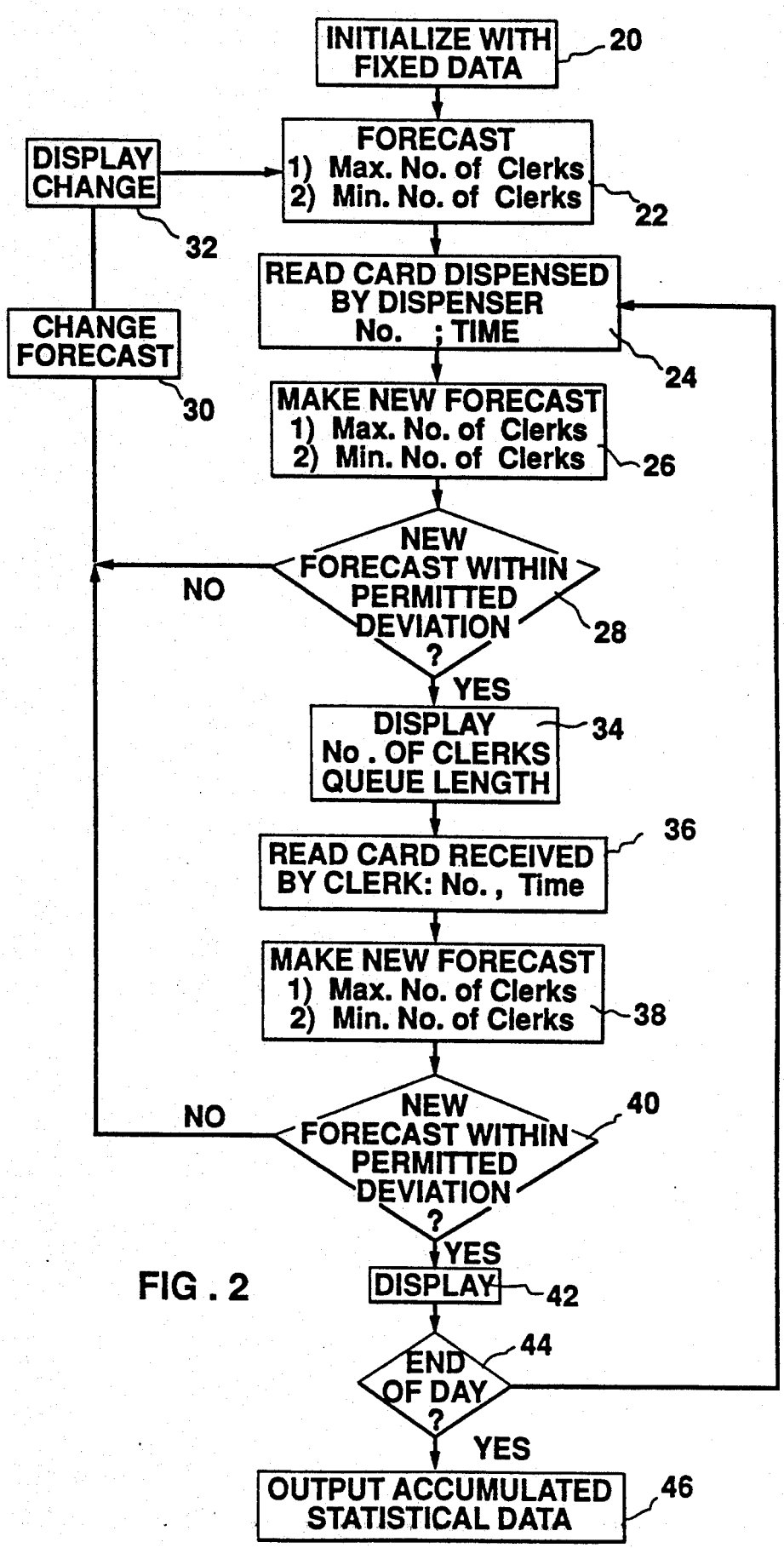
FIG. 2 is a flow chart illustrating the operation of the queue monitoring and control system of FIG. 1.

FIG. 2 is a flow chart illustrating one example of the operation of the queue monitoring and control system of FIG. 1. Thus, as indicated by block 20, the data processor 10 is first initialized with the fixed data from the fixed data input unit 14. From this inputted fixed data, the data processor then makes a forecast as to the maximum number and minimum number of clerks required (block 22).

As each customer arrives at the end of the queue and takes a card 4 from the card dispenser 2, the dispenser feeds the card number to the data processor 10 while the time thereof is also fed to the data processor by the real time clock 12 (block 24). The data processor may then make a new forecast (block 26) as to the maximum and minimum number of clerks (block 26). It then checks to see whether the new forecast is within the permitted deviation specified by the initial fixed data (block 28). If the new forecast is not within the permitted deviation, it changes the forecast (block 30) and displays the change (block 32). On the other hand, if the new forecast is within the permitted deviation, it proceeds to display the number of clerks, queue length, etc. (block 34).

As each customer reaches the beginning of the queue, the customer turns to the first available clerk and hands the clerk the customer's card 4. The card number is read by the card reader 6a-6n of the respective clerk into the data processor 10, with the current time inputted via the real time clock 12 (block 36).

The data processor 10 now has sufficient information as to the waiting time by that particular customer in the queue, and makes a new forecast as to the maximum and minimum number of clerks required (block 38). It then checks to see whether the new forecast is within the permitting deviations as specified in the initial fixed data from the input unit 14 (block 40). If the new forecast is not within the permitted deviations, the data processor changes the forecast (block 30), and displays the change. If the new forecast is within the permitted deviations, the processor then displays various information including the queue-waiting time, the servicing time (namely the time between customers for that particular teller); the current number of clerks; the current queue length, etc.

The foregoing operations continue until the end of the day, or other predetermined time interval (block 44), at which time the statistical data accumulated within the data processor may be printed out (block 46).

While the invention has been described with respect to one preferred embodiment, it will be appreciated that many variations, modifications and other applications of the invention may be made.

What is claimed is:

1. A queue monitoring and/or control system for monitoring and/or controlling a queue of persons waiting for service by a plurality of clerks, comprising:
   a card dispenser for dispensing sequentially-numbered cards to persons as each joins the end of the queue;
   a plurality of card readers, one for each clerk, for reading the card number when received by the clerk from each person as each reaches a clerk at the beginning of the queue;
   a real time clock for indicating the queue joining time for each card dispensed by said dispenser to a person when joining the end of the queue, and the clerk reaching time for each card read by said card readers as each person reaches a clerk at the beginning of the queue;
   and a data processor including: means for inputting predetermined fixed data relating to permissible queue parameters; means for inputting the card numbers and queue joining times from the card dispenser and the real time clock, and the card numbers and clerk reaching times from the card readers and the real time clock; and programmed means for controlling the data processor to indicate any changes in the number of clerks required in order to comply with said permissible queue parameters of the inputted fixed data.

2. The system according to claim 1, wherein said means for inputting said predetermined fixed data inputs data specifying maximum and minimum permitted waiting times, and said programmed means controls the data processor to indicate any changes in the number of clerks required in order to comply with said specified maximum and minimum permitted waiting times.

3. The system according to claim 1, wherein said means for inputting said predetermined fixed data inputs data specifying a maximum queue length, and said programmed means controls the data processor to indicate any changes in the number of clerks required in order to comply with said specified maximum queue length.

4. The system according to claim 1, wherein said means for inputting said predetermined fixed data inputs data specifying an average service time, and said programmed means controls the data processor to indicate any changes in the number of clerks required in order to comply with said specified average service time.

5. The system according to claim 1, wherein said data processor further includes display means for displaying the number of clerks if any to be added or subtracted, the current queue length, the current queue waiting time, and the average service time.

6. The system according to claim 5, wherein said data processor further includes an accumulator and printer for accumulating the data displayed in said display means and for printing out said data at the end of a predetermined time interval.

7. The system according to claim 1, wherein said card dispenser dispenses cards having their numbers coded in the form of a bar code, and said card readers include means for reading said bar code.

8. A queue monitoring and/or control system for monitoring and/or controlling a queue of persons waiting for service by a plurality of clerks, comprising:
   a card dispenser for dispensing sequentially-numbered cards to persons as each joins the end of the queue;
   a plurality of card readers, one for each clerk, for reading the card number when received by the clerk from each person as each reaches a clerk at the beginning of the queue;
   a real time clock for indicating the queue joining time for each card dispensed by said dispenser to a person when joining the end of the queue, and the clerk reaching time for each card read by said card readers as each person reaches a clerk at the beginning of the queue;
   and a data processor including: means for inputting predetermined fixed data relating to permissible queue parameters; means for inputting the card numbers and queue joining times from the card dispenser and the real time clock, and the card numbers and clerk reaching times from the card readers and the real time clock; programmed means for controlling the data processor to indicate any changes in the number of clerks required in order to comply with said permissible queue parameters of the inputted fixed data; and display means for displaying the number of clerks if any to be added or subtracted, the current queue length, the current queue waiting time, and the average service time.

9. The system according to claim 8, wherein said means for inputting said predetermined fixed data inputs data specifying maximum and minimum permitted waiting times, and said programmed means controls the data processor to indicate any changes in the number of clerks required in order to comply with said specified maximum and minimum permitted waiting times.

10. The system according to claim 8, wherein said means for inputting said predetermined fixed data inputs data specifying a maximum queue length, and said programmed means controls the data processor to indicate any changes in the number of clerks required in order to comply with said specified maximum queue length.

11. The system according to claim 8, wherein said means for inputting said predetermined fixed data inputs data specifying an average service time, and said programmed means controls the data processor to indicate any changes in the number of clerks required in order to comply with said specified average service time.

12. The system according to claim 8, wherein said data processor further includes an accumulator and printer for accumulating the data displayed in said display means and for printing out said data at the end of a predetermined time interval.

13. The system according to claim 8, wherein said card dispenser dispenses cards having their numbers coded in the form of a bar code, and said card readers include means for reading said bar code.

* * * * *